(12) United States Patent
Kim

(10) Patent No.: US 8,516,976 B2
(45) Date of Patent: Aug. 27, 2013

(54) INCUBATOR-TYPE FISH FARM USING RECYCLED MATERIALS

(76) Inventor: Chun Bae Kim, Yangju-si (KR)

( * ) Notice: Subject to any disclaimer, the term of this patent is extended or adjusted under 35 U.S.C. 154(b) by 213 days.

(21) Appl. No.: 13/148,342

(22) PCT Filed: Dec. 30, 2009

(86) PCT No.: PCT/KR2009/007971
§ 371 (c)(1),
(2), (4) Date: Aug. 8, 2011

(87) PCT Pub. No.: WO2010/090396
PCT Pub. Date: Aug. 12, 2010

(65) Prior Publication Data
US 2011/0315086 A1    Dec. 29, 2011

(30) Foreign Application Priority Data
Feb. 6, 2009   (KR) .................. 10-2009-0009584

(51) Int. Cl.
*A01K 63/00*   (2006.01)
*A01K 63/04*   (2006.01)

(52) U.S. Cl.
USPC ........................................... 119/225; 119/226

(58) Field of Classification Search
USPC ............... 119/204, 211, 214, 215, 218, 224,
119/225, 226, 228, 229, 231, 240, 243, 245,
119/246, 247, 259, 261, 262, 263
IPC .......................................... A01K 63/00, 63/04
See application file for complete search history.

(56) References Cited

U.S. PATENT DOCUMENTS

| | | | | |
|---|---|---|---|---|
| 4,654,147 A | * | 3/1987 | Bagley ........................... | 210/744 |
| 5,046,451 A | * | 9/1991 | Inslee et al. ................... | 119/227 |
| 5,353,745 A | * | 10/1994 | Fahs, II ......................... | 119/226 |
| 6,065,245 A | * | 5/2000 | Seawright ...................... | 47/62 R |
| 6,499,431 B1 | * | 12/2002 | Lin et al. ........................ | 119/226 |
| 7,222,585 B2 | * | 5/2007 | Jablonsky ...................... | 119/211 |

FOREIGN PATENT DOCUMENTS

| | | | |
|---|---|---|---|
| JP | 2002-119169 | | 4/2002 |
| JP | 2003000097 A | * | 1/2003 |
| JP | 2003-092955 | | 4/2003 |
| KR | 1019980025909 | | 7/1998 |
| KR | 100188229 | | 1/1999 |
| KR | 1020030074852 | | 9/2003 |
| KR | 200376535 | | 2/2005 |
| WO | WO 9636219 A1 | * | 11/1996 |

* cited by examiner

*Primary Examiner* — Son T Nguyen
(74) *Attorney, Agent, or Firm* — IPLA P.A.; James E. Bame

(57) ABSTRACT

An incubator-type fish farm which can enhance water quality without using harmful chemicals and can be operated regardless of a change in temperature. The fish farm includes water reservoirs, corrugated pipe, a water storage unit, a filtering unit, a heating unit, a cooling unit and cover support rods. The corrugated pipe is provided in each water reservoir, and both ends thereof protrude out of the water reservoir. The water storage unit separately stores the acidic water and the alkaline water. The filtering unit stores water discharged from the water reservoirs and supplies the alkaline water or the acidic water from the water storage unit into the water reservoirs. An adsorption plate is provided in the filter unit. The heating unit heats water circulating along the corrugated pipe and the cooling unit cools it. The cover support rods extend from a first end of the top each water reservoir to a second end thereof.

5 Claims, 2 Drawing Sheets

INCUBATOR-TYPE FISH FARM USING RECYCLED MATERIALS

BACKGROUND OF THE INVENTION

The present invention relates generally to incubator-type fish farms using recycled materials and, more particularly, to an incubator-type fish farm using recycled materials which can steadily enhance water quality without using harmful chemicals, such as disinfectants, antibiotics or the like, and which is provided with a cooling unit and a heating unit and thus is able to operate regardless of a sudden change in temperature due to the cold or heat.

Generally, on a fish farm, remnants of feed for fish and the excreta of fish are deposited and accumulated on the bottom of the fish farm, and contaminants continuously accumulate because of the closed-circulation process. Therefore, if water-purity control is not carried out steadily, the water suffers from eutrophication.

A typical ground fish farm is almost a single enclosed space. Despite a small amount of organic or inorganic contaminants, the ecosystem in the fish farm is easily imbalanced. In the case of most fish farms, once water begins to be contaminated, even though a source of contamination is cut off, the level of contamination continuously increases. Therefore, water quality control or an improvement method thereof that is economical and is suitable for fish farms is urgently needed.

Factors of a decline in water quality include: an increase in the population of nasty germs, bacteria and viruses due to variations in surrounding air and water pollution; an increase in the amount of toxic substances in the water, creation of organic matter that discharges harmful gas, such as ammonia or the like; shortage of dissolved oxygen due to an increase in zooplankton resulting from an increase in phytoplankton; deterioration of the transparency of water; a reduction of pH; the abrupt appearance of harmful insects; etc.

To remove such factors, chemicals, such as antibiotics, disinfectants, deadly chemicals, etc. are sprayed. However, the frequent spraying of chemicals causes chemical residue to accumulate, resulting in fish dying.

Furthermore, in the conventional fish farm, hot water is directly supplied into the fish farm when the temperature of the water must be increased. However, this method cannot evenly heat water in the fish farm. Moreover, in an area into which hot water is directly supplied, because of a rapid temperature increase, aerobic bacteria or the like which have the self-purification ability may not be able to live.

SUMMARY OF THE INVENTION

Accordingly, the present invention has been made keeping in mind the above problems occurring in the prior art, and an object of the present invention is to provide an incubator-type fish farm using recycled materials which can steadily enhance water quality in a natural and environmentally-friendly manner without using harmful chemicals, such as disinfectants, antibiotics or the like, and which is provided with a cooling unit and a heating unit and thus is able to be operated regardless of a sudden change in temperature due to the cold or heat and can raise warm water fish and cold water fish anywhere regardless of location.

In order to accomplish the above object, the present invention provides an incubator-type fish farm using recycled materials, including: a plurality of water reservoirs filled with water, each of the water reservoirs being made of synthetic resin and having a semi-cylindrical shape, with a bottom plate provided in each of the water reservoirs, the bottom plate being made of synthetic resin; a corrugated pipe provided in each of the water reservoirs, the corrugated pipe having a first end and a second end that protrude out of the water reservoir; a water storage unit classifying water discharged from the water reservoirs into acidic water and alkaline water and separately storing the acidic water and the alkaline water; a filtering unit storing water discharged from the water reservoirs, the filtering unit supplying the alkaline water or the acidic water from the water storage unit into the water reservoirs, with an adsorption plate provided in the filter unit; a heating unit for heating water circulating along the corrugated pipe; a cooling unit for cooling water circulating along the corrugated pipe; and a plurality of cover support rods extending from a first edge of a top of each of the water reservoirs to a second edge thereof.

Preferably, 9% to 11% of water discharged from the water reservoirs may be stored in the water storage unit, and remaining 89% to 91% of the water may be stored in the filtering unit.

The heating unit may comprise a briquette boiler and an oil boiler.

The cover support rod may include: a first cover support rod connecting a first point corresponding to 24% to 26% of an entire length of the first edge of the top of the water reservoir with a second point corresponding both to the first point and to 24% to 26% of an entire length of the second edge of the top of the water reservoir; a second cover support rod connecting a third point corresponding to 49% to 51% of the entire length of the first edge of the top of the water reservoir with a fourth point corresponding both to the third point and to 49% to 51% of the entire length of the second edge of the top of the water reservoir; and a third cover support rod connecting a fifth point corresponding to 74% to 76% of the entire length of the first edge of the top of the water reservoir with a sixth point corresponding both to the fifth point and to 74% to 76% of the entire length of the second edge of the top of the water reservoir.

The water reservoirs may include an air supply unit.

As described above, in an incubator-type fish farm using recycled materials according to the present invention, water quality can be steadily enhanced in a natural and environmentally-friendly manner without using harmful chemicals, such as disinfectants, antibiotics or the like. Furthermore, the fish farm is provided with a cooling unit and a heating unit. Therefore, the fish farm can operate regardless of a sudden change in temperature due to the cold or heat, and warm water fish and cold water fish can be raised anywhere regardless of location.

DESCRIPTION OF THE ELEMENTS IN THE DRAWINGS

Figure 1:
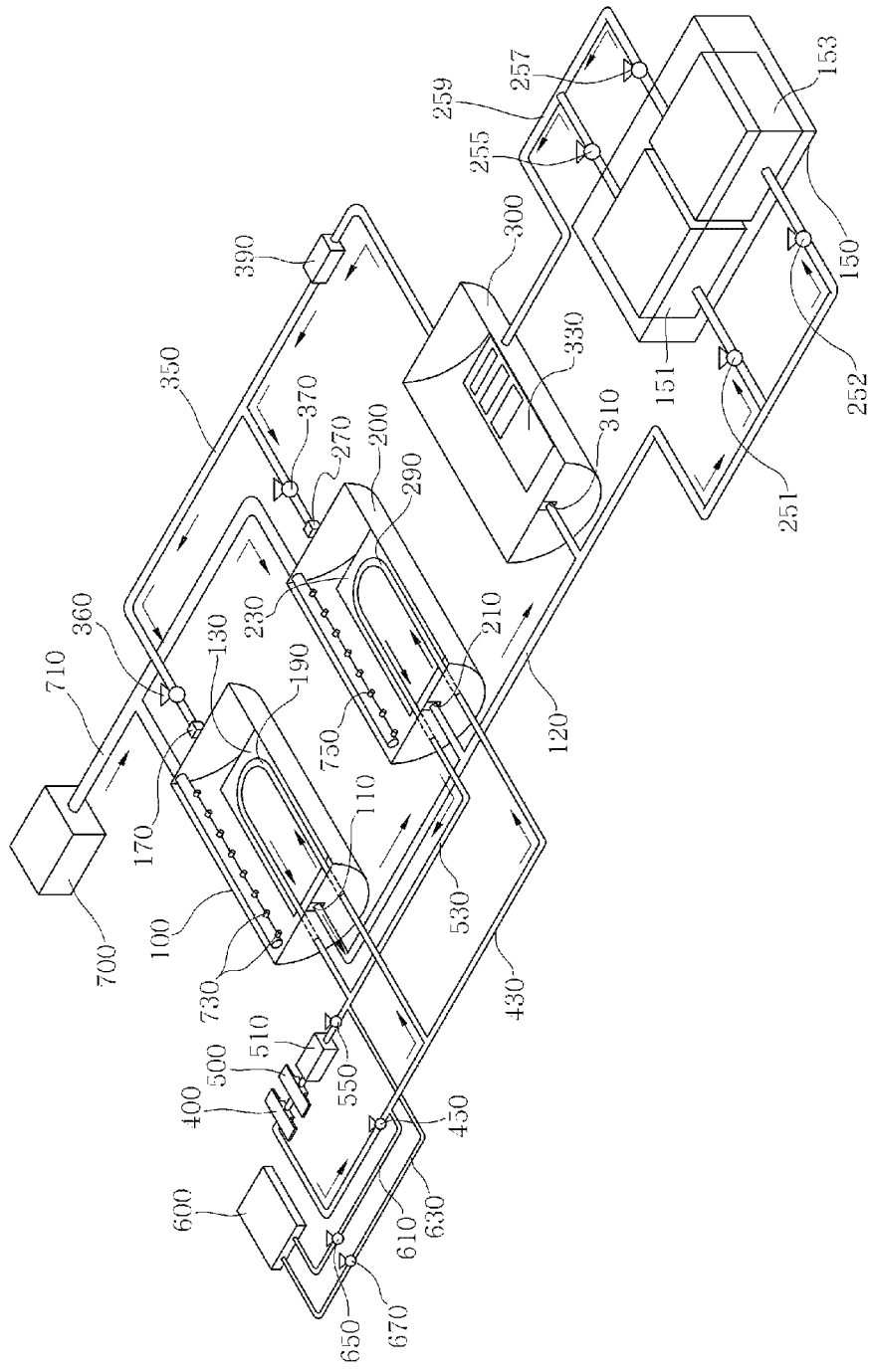
FIG. 1 is a schematic view showing an incubator-type fish farm using recycled materials, according to an embodiment of the present invention.

100: first water reservoir 190: first corrugated pipe
200: second water reservoir 290: second corrugated pipe
300: filtering unit 330: adsorption plate
400: first heating unit 500: second heating unit
600: cooling unit 810: first cover support rod
820: second cover support rod 830: third cover support rod
850: cover

DETAILED DESCRIPTION OF THE INVENTION

Hereinafter, a preferred embodiment of the present invention will be described in detail with reference to the attached drawings so that those skilled in the art can easily embody the present invention.

Figure 2:
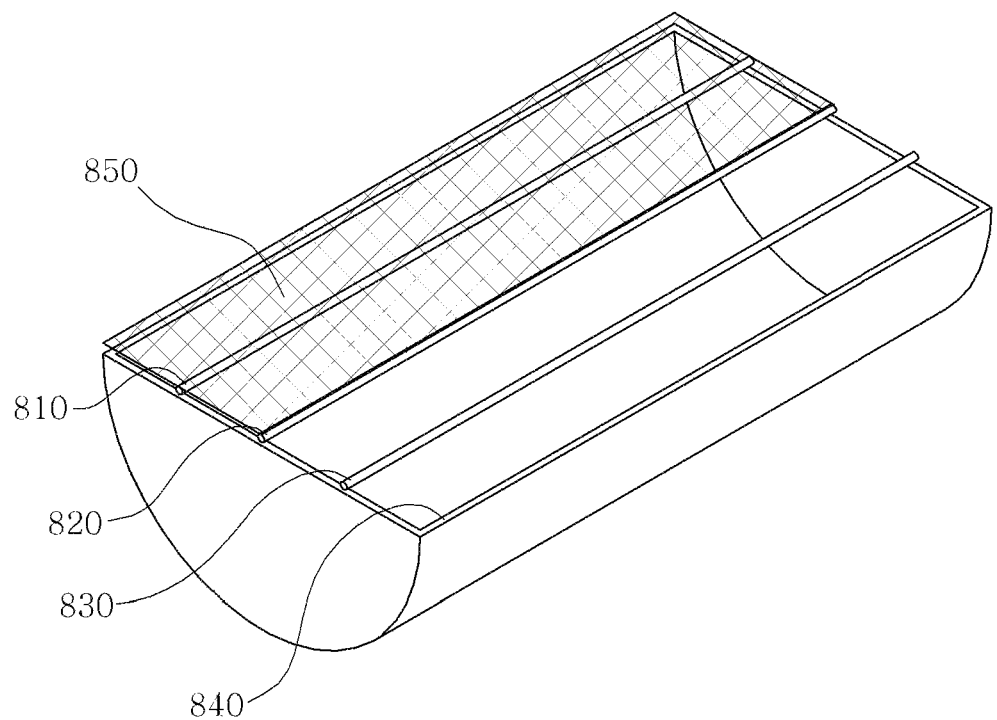
FIG. 2 is a perspective view showing a water reservoir according to the embodiment of the present invention.

FIG. 1 is a schematic view showing an incubator-type fish farm using recycled materials, according to the embodiment of the present invention. FIG. 2 is a perspective view showing a water reservoir according to the embodiment of the present invention.

As shown in FIG. 1, the four season operation fish farm according to the embodiment of the present invention includes a first water reservoir 100 and a second water reservoir 200 which are filled with water to raise fish (not shown) therein. The fish farm further includes a filtering unit 300, a first heating unit 400, a second heating unit 500, a cooling unit 600 and an air supply unit 700.

Although this embodiment of the present invention has been illustrated as having the two water reservoirs including the first water reservoir 100 and the second water reservoir 200, the fish farm of the present invention may further include an additional water reservoir when necessary depending on the kind of fish, the ecological characteristics of the fish, etc. The first and second water reservoirs 100 and 200 may be provided by cutting in half a cylindrical synthetic resin (recycled plastic) pipe that has been used as a sewer pipe or the like. In this case, each water reservoir 100, 200 has a semi-cylindrical shape. Because recycled material which has been used as a sewer pipe or the like is reused, the present invention can markedly reduce the cost of equipment and contribute to environmental conservation.

For reference, in the present invention, although a synthetic resin pipe has been illustrated as being used for the water reservoirs 100 and 200 that raise fish therein, they may be used in various methods, for example, to raise plants, such as crops, flowers, etc., shellfish, such as marsh snails, apple snails, etc., or water fleas which can become feed for fish, when necessary.

A first bottom plate 130 and a second bottom plate 230 which are made of synthetic resin are respectively provided on the bottoms of the first and second water reservoirs 100 and 200.

The first and second bottom plates 130 and 230 also function as heat insulation material to prevent heat from being transferred out of the first and second water reservoirs 100 and 200 in the winter season and prevent heat from being transferred thereinto in the summer season.

Further, a first corrugated pipe 190 and a second corrugated pipe 290 through which hot water or cold water circulates are respectively provided at lower positions in the first and second water reservoirs 100 and 200. First and second ends of each corrugated pipe 190, 290 protrude out of one end of the corresponding water reservoir 100, 200.

The first heating unit 400 and the second heating unit 500 are provided outside the first and second water reservoirs 100 and 200 to supply hot water to the water reservoirs 100 and 200. The cooling unit 600 is also provided outside the first and second water reservoirs 100 and 200 to supply cold water thereto.

A second end of the first heating unit 400 is connected to a first end of the second heating unit 500. A first circulation pipe 430 is connected to a first end of the first heating unit 400 so that hot water which has been heated by the first and second heating units 400 and 500 flows out of the first heating unit 400 along the first circulation pipe 430.

The first ends of the first and second corrugated pipes 190 and 290 are connected to the first circulation pipe 430 so that hot water is supplied from the first circulation pipe 430 into the first and second corrugated pipes 190 and 290. The hot water heats water in the first and second water reservoirs 100 and 200 when flowing through portions of the first and second corrugated pipe 190 and 290 that are disposed in the first and second water reservoirs 100 and 200.

The temperature of the hot water can be controlled within a range from 18° C. through 38° C. depending on the kind of fish. Due to this construction, warm water fish can easily adapt to circumstances regardless of a change in temperature.

As such, because hot water that flows through the first and second corrugated pipes 190 and 290 indirectly and slowly heats water in the first and second water reservoirs 100 and 200, fish which live in the first and second water reservoirs 100 and 200 are under little stress. Further, microbes or the like having self-purification abilities can also live in the water reservoirs 100 and 200.

Subsequently, hot water, which has passed through the portions of the first and second corrugated pipes 190 and 290 that are in the first and second water reservoirs 100 and 200, is sent to the second ends of the first and second corrugated pipes 190 and 290. The second ends of the first and second corrugated pipes 190 and 290 are connected to the second circulation pipe 530 that is connected to a second end of the second heating unit 500. Water that is sent to the second ends of the first and second corrugated pipes 190 and 290 is supplied into the first and second heating units 400 and 500 so that the water is heated again.

Furthermore, a first drive unit 510, such as a motor pump or the like, is provided on a first end of the second circulation pipe 530 to make the circulation of the water smooth.

Meanwhile, a first cooling pipe 610 is connected at a first end thereof to a first predetermined portion of the cooling unit 600 so that cold water cooled by the cooling unit 600 flows out of the cooling unit 600 along the first cooling pipe 610. A second end of the first cooling pipe 610 is connected to the first circulation pipe 430 so that cold water can be supplied from the second end of the first cooling pipe 610 into the first and second corrugated pipes 190 and 290 to cool water in the first and second water reservoirs 100 and 200.

In the present invention, the temperature of cold water can be controlled within a range from 0° C. through 17° C. depending on the kind of fish. Due to this construction, cold water fish can easily adapt to circumstances regardless of a change in temperature.

Furthermore, cold water which flows through the first and second corrugated pipes 190 and 290 also indirectly and slowly cools water which is in the first and second water reservoirs 100 and 200. Accordingly, fish which live in the first and second water reservoirs 100 and 200 will be under little stress.

Subsequently, cold water, which has passed through the portions of the first and second corrugated pipes 190 and 290 that are in the first and second water reservoirs 100 and 200, flows through the second circulation pipe 530 and then is supplied into the cooling unit 600 via the second cooling pipe 630 so that the cold water is cooled by the cooling unit 600 again. The second cooling pipe 630 is connected at a first end thereof to a second predetermined portion of the cooling unit 600, and a second end of the second cooling pipe 630 is connected to the second circulation pipe 530.

As such, in the present invention, water in the first and second water reservoirs 100 and 200 is slowly heated or cooled by the first and second corrugated pipes 190 and 290. Thus, the existence of microbes, such as aerobic bacteria, etc., which are sensitive to variations in water quality, can be reliably ensured. Further, the present invention can prevent various kinds of diseases which may occur in fish. Therefore, high-quality fish can be produced.

Here, a first valve 450 and a second valve 550 are respectively provided on a first end of the first circulation pipe 430 and the first end of the second circulation pipe 530. When cold water is supplied to the first and second corrugated pipes 190 and 290 by the operation of the cooling unit 600, the first valve 450 and the second valve 550 are interrupted to prevent cold water discharged from the cooling unit 600 from entering the first heating unit 400 or the second heating unit 500.

In the same manner, a first cooling valve 650 and a second cooling valve 670 are respectively provided on the first end of the first cooling pipe 610 and the first end of the second cooling pipe 630. When hot water is supplied to the first and second corrugated pipes 190 and 290 by the operation of the first or second heating unit 400 or 500, the first cooling valve 650 and the second cooling valve 670 are interrupted to prevent hot water discharged from the first or second heating unit 400 or 500 from entering the cooling unit 600.

Preferably, the first heating unit 400 may comprise a briquette boiler, and the second heating unit 500 may comprise an oil boiler.

Therefore, even when only either the first heating unit 400 or the second heating unit 500 is operated, hot water can be supplied to the first and second water reservoirs 100 and 200. Thus, even if the second heating unit 500 is out of oil during the operation, hot water can be supplied by just the first heating unit 400. On the contrary, when the first heating unit 400 is out of briquette, hot water can be supplied only by the second heating unit 500.

In particular, in the winter, even if either the first or second heating unit 400 or 500 malfunctions, because the temperature of water in the first and second water reservoirs 100 and 200 can be increased only by the other normally operating one of the first and second heating units 400 and 500, fish can be prevented from being harmed, for example, from being frozen to death. Further, even if either the first or second heating unit 400 or 500 malfunctions, the malfunctioned heating unit 400 or 500 can be heated by the other normal one and thus prevented from being frozen and rupturing in the winter.

Therefore, the fish farm according to the present invention can be operated by controlling the first and second heating units 400 and 500 and the cooling unit 600 during all four seasons.

Furthermore, as well as the briquette boiler and the oil boiler, an additional boiler, for example, an electric boiler (not shown), a solar energy collecting boiler (not shown) or the like, may be provided.

In this case, even if the briquette boiler or the oil boiler cannot be operated, the electric boiler can be used and the fish farm can operate normally. Further, even if the electricity should suddenly fail, the fish farm can be normally operated by the solar energy collecting boiler that can supply heat energy for one to three days.

Meanwhile, if warm water fish, such as carp, eels, etc., is raised in the first water reservoir 100 and cold water fish, such as trout, salmons, etc., is raised in the second water reservoir 200, hot water is supplied to the first water reservoir 100 by the first and second heating units 400 and 500, and cold water is supplied to the second water reservoir 200 by the cooling unit 600. As such, warm water fish and cold water fish can be raised at the same time.

In addition, the air supply unit 700 is coupled to the first and second water reservoirs 100 and 200 to supply oxygen to water in the water reservoirs 100 and 200.

The air supply unit 700 includes an air supply pipe 710 which is inserted into the first and second water reservoirs 100 and 200. A plurality of first air supply holes 730 are formed in a portion of the air supply pipe 710 that is inserted into the first water reservoir 100, and a plurality of second air supply holes 750 are formed in a portion of the air supply pipe 710 that is inserted into the second water reservoir 200. Thus, air is supplied into the first water reservoir 100 through the first air supply hole 730, and air is supplied into the second water reservoir 200 through the second air supply hole 750.

Air supplied into the first and second water reservoirs 100 and 200 circulates in the water reservoirs 100 and 200 and thus maintains the dissolved oxygen of water in the water reservoirs 100 and 200 constant, thereby purifying and stabilizing the water.

Meanwhile, a first water discharge hole 110 is formed in a first end of the first water reservoir 100 so that water with which the first water reservoir 100 is filled can be discharged out of the first water reservoir 100 through the first water discharge hole 110. A second water discharge hole 210 is formed in a first end of the second water reservoir 200 so that water with which the second water reservoir 200 is filled can be discharged out of the second water reservoir 200 through the second water discharge hole 210.

Further, a water discharge pipe 120 is connected to the first water discharge hole 110 so that water discharged from the first water reservoir 100 flows along the water discharge pipe 120. The second water discharge hole 210 is also connected to the water discharge pipe 120 so that water discharged from the second water reservoir 200 flows along the water discharge pipe 120.

The filtering unit 300 is made of the same material as and has the same shape as those of the first and second water reservoirs 100 and 200. An inlet 310 which is connected to the water discharge pipe 120 is formed in a first end of the filtering unit 300 so that water flowing along the water discharge pipe 120 is supplied into the filtering unit 300 through the inlet 310.

In addition, an adsorption plate 330 is provided in the filtering unit 300 to remove impurities, sludge, etc. from water supplied from the water discharge pipe 120.

A supply pipe 350 is connected to a second end of the filtering unit 300 so that water discharged from the filtering unit 300 flows along the supply pipe 350. A first supply hole 170 and a second supply hole 270 into which water that flows through the supply pipe 350 is supplied are respectively formed in second ends of the first and second water reservoirs 100 and 200.

Furthermore, a first supply valve 360 and a second supply valve 370 are respectively disposed at positions adjacent to the first supply hole 170 and the second supply hole 270. The first supply valve 360 and a second supply valve 370 respectively control the amount of water supplied into the first water reservoir 100 and the second water reservoir 200. A second drive unit 390, such as a motor pump or the like, is provided at a predetermined position on the supply pipe 350 so that water can flow smoothly.

Meanwhile, water may be acidified while fish are living in the first and second water reservoirs 100 and 200 according to the present invention having the above-mentioned construction.

In this case, the filtering unit 300 supplies alkaline water into the first and second supply holes 170 and 270 through the supply pipe 350 to neutralize acidified water. Because acidified water in the first and second water reservoirs 100 and 200 has a comparatively low specific gravity, it moves towards the surface of the water. Then, the first water discharge hole 110 and the second water discharge 210 are open to discharge the acidified water out of the first and second water reservoirs 100 and 200.

The acidified water flows along the water discharge pipe 120 and is stored in the filtering unit 300. Here, 9% to 11% of water discharged from the first and second water reservoirs 100 and 200 is stored in a water storage unit 150 which is provided on an end of the water discharge pipe 120. The remaining 89% to 91% of the water is stored in the filtering unit 300 again.

The water storage unit 150 includes an acidic water storage tank 151 and an alkaline water storage tank 153.

Thus, when acidic water is discharged from the first and second water reservoirs 100 and 200, it is stored in the acidic water storage tank 151. When alkaline water is discharged from the first and second water reservoirs 100 and 200, it is stored in the W alkaline water storage tank 153.

Furthermore, a first storage tank valve 251 is provided at a first end of the acidic water storage tank 151, and a second storage tank valve 252 is provided at a first end of the alkaline water storage tank 153 so as to classify water discharged from the first and second water reservoirs 100 and 200 into acidic water and alkaline water and separately store it in the corresponding tank 151 or 153 depending on the kind of water.

In other wards, if acidic water is discharged from the first and second water reservoirs 100 and 200, the first storage tank valve 251 is open and the second storage tank valve 253 is closed so that the acidic water is stored in acidic water storage tank 151.

On the contrary, if alkaline water is discharged from the first and second water reservoirs 100 and 200, the first storage tank valve 251 is closed and the second storage tank valve 253 is open so that the alkaline water is stored in the alkaline water storage tank 153.

Water that has been stored in the water storage unit 150 is supplied into the filtering unit 300. For this, a supplementary water pipe 259 which is connected to the filtering unit 300 is connected both to a second end of the acidic water storage tank 151 and to a second end of the alkaline water storage tank 153.

Furthermore, a first supplementary water valve 255 is provided on the supplementary water pipe 259 at the second end of the acidic water storage tank 151, and a second supplementary water valve 257 is provided on the supplementary water pipe 259 at the second end of the alkaline water storage tank 153.

To supply acidic water into the filtering unit 300, the first supplementary water valve 255 is open and the second supplementary water valve 257 is closed so that acidic water is supplied into the filtering unit 300 through the supplementary water pipe 259. On the contrary, to supply alkaline water into the filtering unit 300, the first supplementary water valve 255 is closed and the second supplementary water valve 257 is open so that alkaline water is supplied into the filtering unit 300 through the supplementary water pipe 259.

Meanwhile, acidified water that has been discharged from the first and second water reservoirs 100 and 200 and stored in the filtering unit 300 is supplied into the first and second water reservoirs 100 and 200 through the supply pipe 350 again. The reason for this is that because a variety of diseases may be induced in fish when water quality environment is suddenly changed, a large amount of water that is discharged from the first and second water reservoirs 100 and 200 must be re-supplied into the first and second water reservoirs 100 and 200 again to make the water quality environment similar to the existing environment.

On the contrary, if water in the first and second water reservoirs 100 and 200 is alkalized while fish are living therein, the first water discharge hole 110 and the second water discharge hole 210 are open to discharge alkalized water therefrom.

The alkalized water flows along the water discharge pipe 120 and then is stored in the filtering unit 300. In the same manner, 9% to 11% of water discharged from the first and second water reservoirs 100 and 200 is stored in the water storage unit 150 which is provided on the end of the water discharge pipe 120. The remaining 89% to 91% of the water is stored in the filtering unit 300 again.

Further, water that has been stored in the filtering unit 300 is supplied into the first and second water reservoirs 100 and 200 again through the supply pipe 350. The reason for this is the same as that described above.

Here, alkalized water that is stored in the filtering unit 300 is acidified before being re-supplied into the first and second water reservoirs 100 and 200. To acidify water, for example, aquatic insects, such as the larvae of a mosquito or mayfly, may be contained in the water stored in the filtering unit 300. Alternatively, acidic water that has been in the acidic water storage tank 151 of the water storage unit 150 may be supplied into the first and second water reservoirs 100 and 200.

In the same manner, when acidified water is stored in the filtering unit 300, it is alkalized before being re-supplied into the first and second water reservoirs 100 and 200. This may be realized by supplying alkaline water that has been stored in the alkaline water storage tank 153 of the water storage unit 150 into the first and second water reservoirs 100 and 200.

Meanwhile, water only in either the first water reservoir 100 or the second water reservoir 200 may be acidified or alkalized.

In this case, only water in the related water reservoir is neutralized by water in the filtering unit 300.

For instance, if water only in the first water reservoir 100 is acidified, the second supply hole 270 and the second supply valve 370 are closed, and the first supply hole 170 and the second supply valve 360 are open so that alkaline water is supplied into the first water reservoir 100.

Subsequently, the second water discharge hole 210 is closed, and only the first water discharge hole 110 is open. Then, the acidified water is discharged from the first water reservoir 100 and stored in the filtering unit 300.

For reference, to store all water discharged from the first water reservoir 100 or the second water reservoir 200 in the filtering unit 300 rather than the water storage unit 150, the first storage tank valve 251 and the second storage tank valve 252 are closed such that water cannot flow into the water storage unit 150.

On the contrary, to store all water discharged from the first water reservoir 100 or the second water reservoir 200 in the water storage unit 150, the inlet 310 is closed and the first storage tank valve 251 or the second storage tank valve 252 is open such that all water flows into the water storage unit 150.

Meanwhile, the adsorption plate 330 filters out impurities and sludge, etc. contained in water that is discharged from the first water reservoir 100, the second water reservoir 200 or the water storage unit 150 and supplied into the filtering unit 300. Thus, clean water from which impurities and sludge, etc. has been removed is supplied into the first water reservoir 100 and the second water reservoir 200 through the $_{supply}$ pipe 350.

Furthermore, impurities, such as excreta of fish, remnants of feed for fish, etc., are also present in water in the first and second water reservoirs 100 and 200. These impurities are deposited on the bottom plates 130 and 230 provided on the bottoms of the first and second water reservoirs 100 and 200.

If bacteria, noxious insects or the like are infested by such impurities, fish are prone to die. In the present invention, the bottom plates 130 and 230 are periodically replaced with new ones. It is preferable that the replacement period be two years.

As such, the adsorption plate 330 primarily filters out impurities, sludge or the like from water, and the bottom plates 130 and 230 can secondarily filter out impurities from water. Therefore, a separate operation for removing bacteria, noxious insects or the like, for example, spraying harmful chemicals, such as a disinfectant, is not required.

Meanwhile, in the present invention, each of the first and second water reservoirs 100 and 200 has a semi-cylindrical shape. Thus, the depth from the water surface to the bottom of the water reservoir 100, 200 increases from opposite sides to the central portion. Therefore, the water pressure varies depending on the location, because it increases as the depth of the water increases.

Therefore, various kinds of fish can be raised together in the water reservoir 100, 200 despite the fact that depending on the kind of fish, the depth at which fish prefer to live is different.

Meanwhile, a first cover support rod 810, a second cover support rod 820 and a third cover support rod 830 extend from a first edge of the open upper end of each water reservoir 100, 200 to a second edge of the open upper end thereof. When the water reservoir 100, 200 is covered with a cover 850, the first, second and third cover support rods 810, 820 and 830 function to support the cover 850 to prevent the cover 850 from sagging towards the water surface.

Preferably, the cover 850 is made of material which is black and can block out light. For example, the cover 850 may comprise a shade net that can block out 65% to 75% of sunlight. The reason for this is that under these conditions, microbes that are symbiotic with fish can live in the water reservoir 100, 200.

The first cover support rod 810 connects a first point which corresponds to 24% to 26% of the entire length of the first edge of the open upper end of the water reservoir 100, 200 with a second point which corresponds both to the first point and to 24% to 26% of the entire length of the second edge of the open upper end of the water reservoir 100, 200. The second cover support rod 820 connects a third point which corresponds to 49% to 51% of the entire length of the first edge of the open upper end of the water reservoir 100, 200 with a fourth point which corresponds both to the third point and to 49% to 51% of the entire length of the second edge of the open upper end of the water reservoir 100, 200. The third cover support rod 830 connects a fifth point which corresponds to 74% to 76% of the entire length of the first edge of the open upper end of the water reservoir 100, 200 with a sixth point which corresponds both to the fifth point and to 74% to 76% of the entire length of the second edge of the open upper end of the water reservoir 100, 200.

Meanwhile, it may be necessary to only partially cover the water reservoir 100, 200 with the cover 850. If the cover 850 covers the water reservoir 100, 200 from a corresponding edge of the water reservoir 100, 200 only to the first cover support rod 810, only about 25% of the area of the open upper end of the water reservoir 100, 200 is covered with the cover 850.

Further, if the cover 850 covers the water reservoir 100, 200 from the corresponding edge of the water reservoir 100, 200 only to the second cover support rod 820, about 50% of the area of the open upper end of the water reservoir 100, 200 is covered with the cover 850.

In the same manner, if the cover 850 covers the water reservoir 100, 200 from the corresponding edge of the water reservoir 100, 200 only to the third cover support rod 830, about 75% of the area of the open upper end of the water reservoir 100, 200 is covered with the cover 850.

As mentioned above, the degree to which the water reservoir 100, 200 is covered with the cover 850 can be controlled using the first, second and third cover support rods 810, 820 and 830.

Meanwhile, a sensing unit (not shown) may be provided on the water surface in each water reservoir 100, 200 to measure the quality of water and send the measurement. The sensing unit may include a temperature sensor (not shown) which measures the temperature of water in the water reservoir 100, 200, a dissolved oxygen sensor (not shown) which measures the dissolved oxygen in the water, a pH sensor (not shown) which measures the pH of the water, and a water level and turbidity sensor (not shown) which measures the water level or the turbidity of water.

As necessary, a sensor which can measure the concentration of ammoniacal nitrogen or nitrate may be provided.

Meanwhile, a ring blower is preferably used as the air supply unit 700. The numbers of first and second air supply holes 730 and 750 which are respectively positioned in the first and second water reservoirs 100 and 200 may change depending on the amount of fish.

For example, if a comparatively large amount of fish live in the first and second water reservoirs 100 and 200, it is preferable that the numbers of first and second air supply holes 730 and 750 be proportionally increased to effectively maintain water quality.

Thereby, the quality of water can be controlled, and the optimum environment for microbes can be formed. Any type of fish can be raised in a short period of time. Chemical-free and high-quality fish can be produced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:
1. An incubator-type fish farm using recycled materials, comprising:
   a plurality of water reservoirs filled with water, each of the water reservoirs being made of synthetic resin and having a semi-cylindrical shape, with a bottom plate provided in each of the water reservoirs, the bottom plate being made of synthetic resin;
   a corrugated pipe provided in each of the water reservoirs, the corrugated pipe having a first end and a second end that protrude out of the water reservoir;
   a water storage unit classifying water discharged from the water reservoirs into acidic water and alkaline water and separately storing the acidic water and the alkaline water;
   a filtering unit storing water discharged from the water reservoirs, the filtering unit supplying the alkaline water or the acidic water from the water storage unit into the water reservoirs, with an adsorption plate provided in the filter unit;
   a heating unit for heating water circulating along the corrugated pipe;

a cooling unit for cooling water circulating along the corrugated pipe; and a plurality of cover support rods extending from a first edge of a top of each of the water reservoirs to a second edge thereof.

2. The incubator-type fish farm using recycled materials as set forth in claim 1, wherein 9% to 11% of water discharged from the water reservoirs is stored in the water storage unit, and remaining 89% to 91% of the water is stored in the filtering unit.

3. The incubator-type fish farm using recycled materials as set forth in claim 1, wherein the heating unit comprises a briquette boiler and an oil boiler.

4. The incubator-type fish farm using recycled materials as set forth in claim 1, wherein the cover support rod comprises:

a first cover support rod connecting a first point corresponding to 24% to 26% of an entire length of the first edge of the top of the water reservoir with a second point corresponding both to the first point and to 24% to 26% of an entire length of the second edge of the top of the water reservoir;

a second cover support rod connecting a third point corresponding to 49% to 51% of the entire length of the first edge of the top of the water reservoir with a fourth point corresponding both to the third point and to 49% to 51% of the entire length of the second edge of the top of the water reservoir; and a third cover support rod connecting a fifth point corresponding to 74% to 76% of the entire length of the first edge of the top of the water reservoir with a sixth point corresponding both to the fifth point and to 74% to 76% of the entire length of the second edge of the top of the water reservoir.

5. The incubator-type fish farm using recycled materials as set forth in claim 1, wherein the water reservoirs comprise an air supply unit.

* * * * *